Feb. 4, 1969
C. D. PROSSER
3,425,422
ROTARY HUSKING UNIT
Filed Oct. 3, 1966
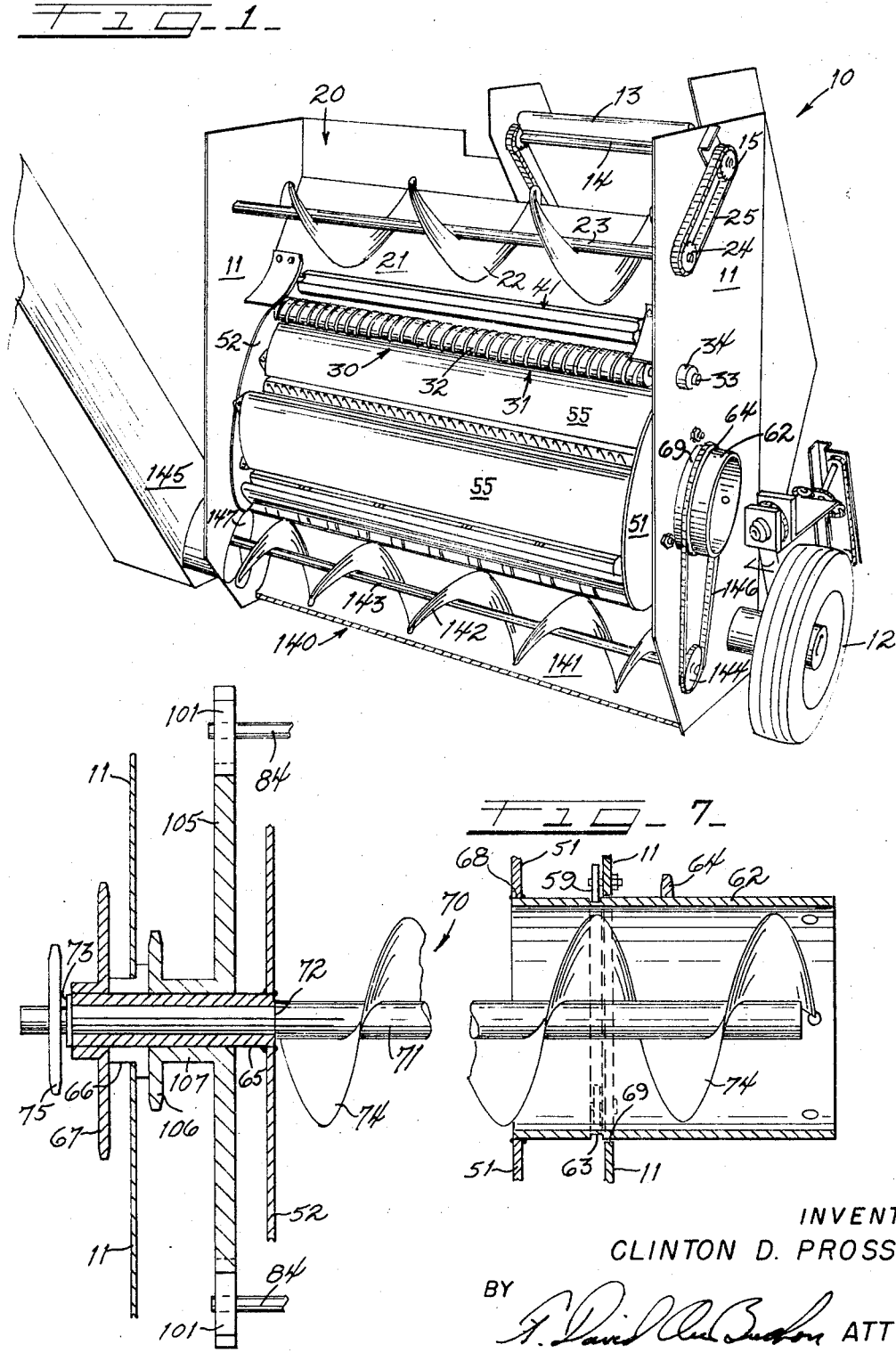
INVENTOR
CLINTON D. PROSSER

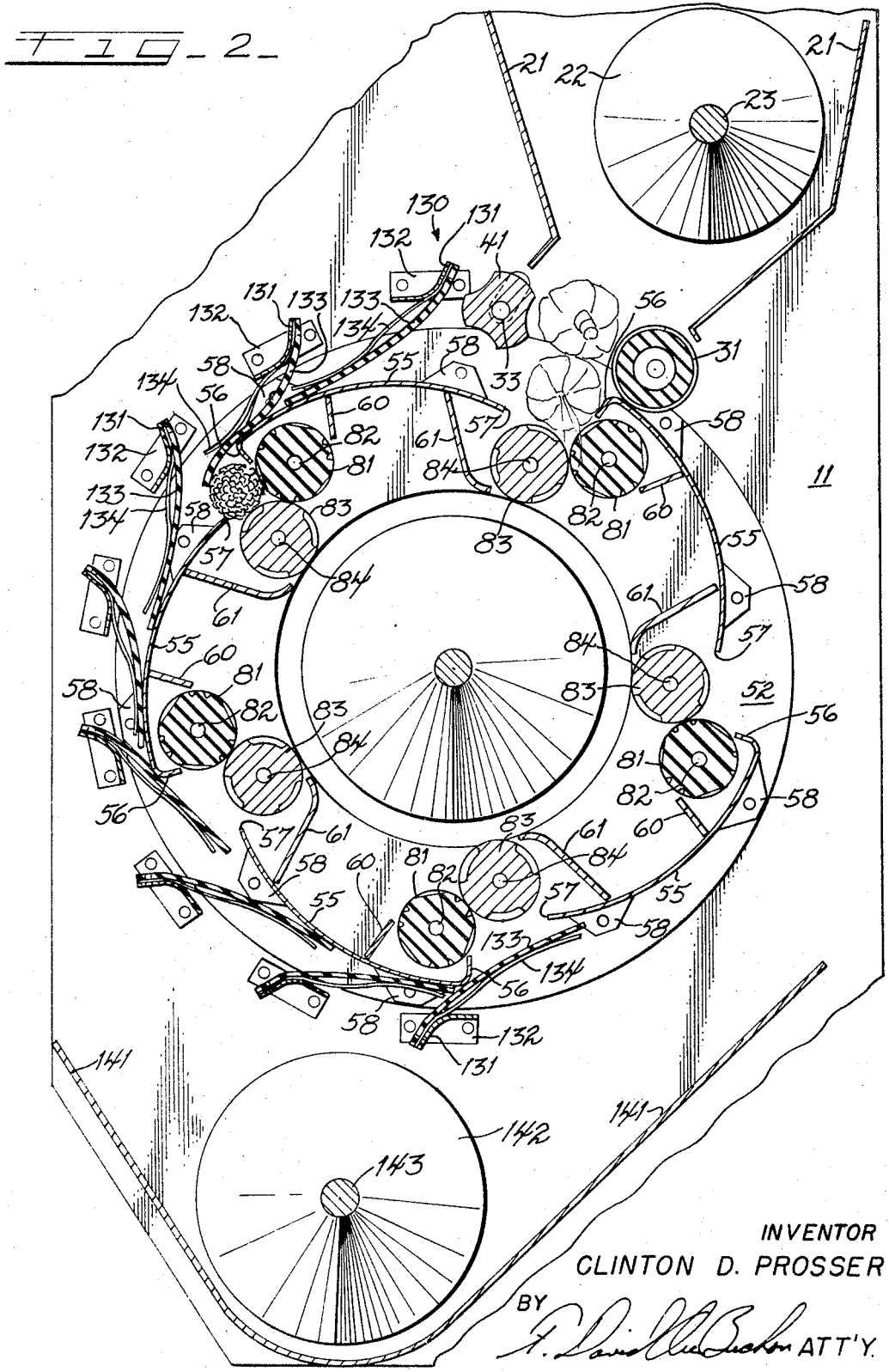

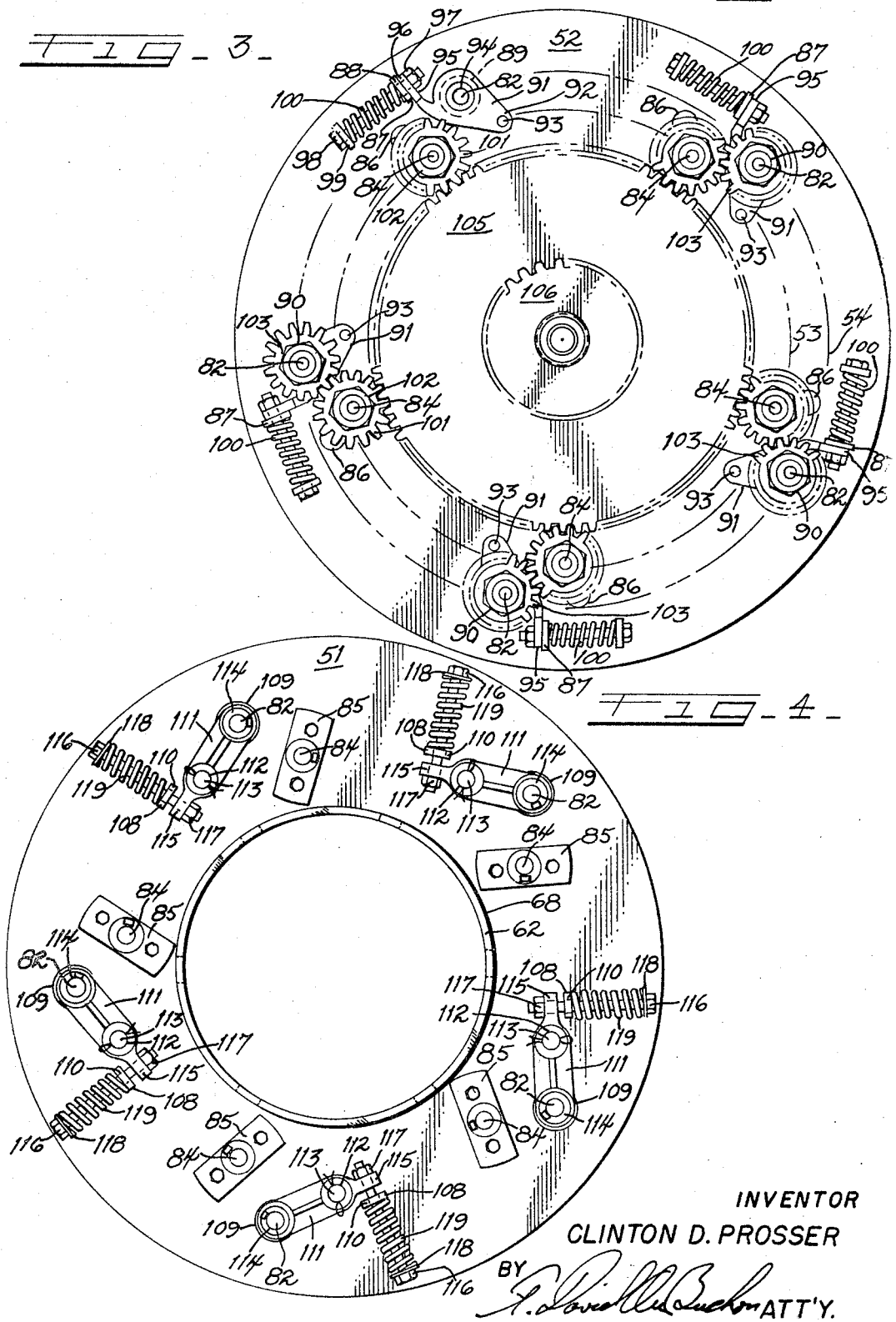

Feb. 4, 1969
C. D. PROSSER
3,425,422
ROTARY HUSKING UNIT
Filed Oct. 3, 1966
Sheet 4 of 4
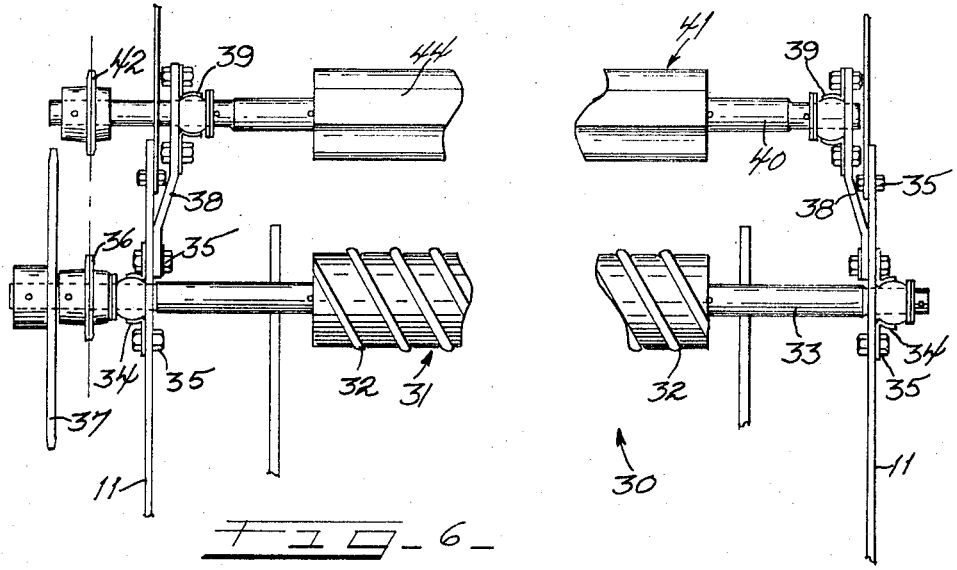
FIG_6_
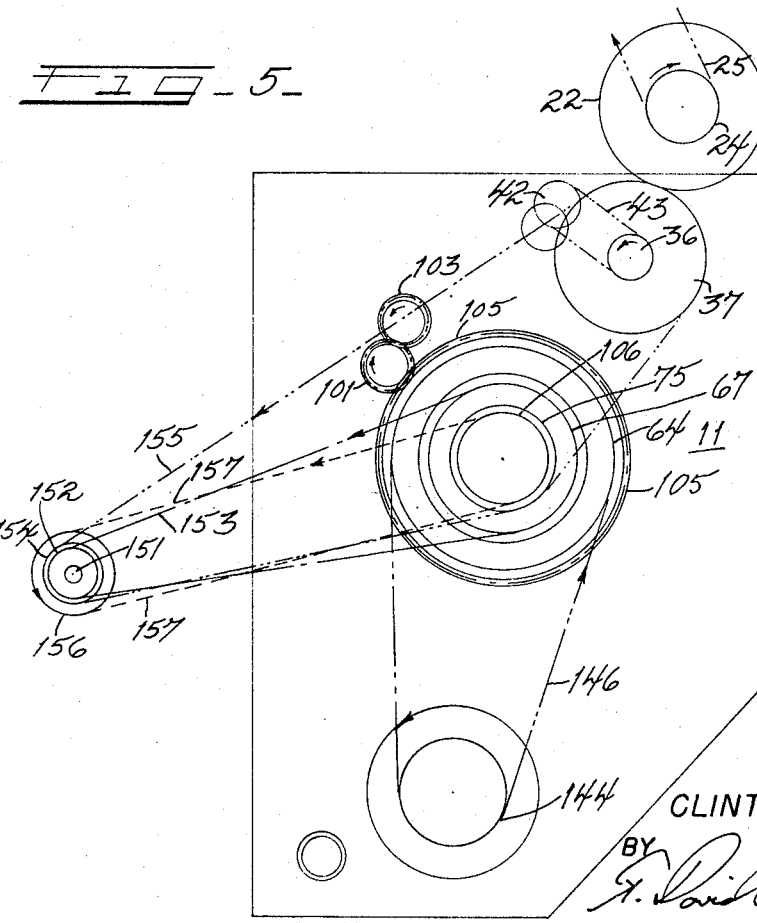
FIG_5_
INVENTOR
CLINTON D. PROSSER
BY
ATT'Y.

United States Patent Office 3,425,422
Patented Feb. 4, 1969

3,425,422
ROTARY HUSKING UNIT
Clinton D. Prosser, East Moline, Ill., assignor to International Harvester Company, Chicago, Ill., a corporation of Delaware
Filed Oct. 3, 1966, Ser. No. 583,685
U.S. Cl. 130—5                       14 Claims
Int. Cl. A01f 11/06

The present invention relates generally to improvements in corn husking units and the like and more particularly to a new and improved rotary husking unit.

The corn yield per acre has been greatly increased in recent years through the use of hybrid type corn, pesticides, fertilizers and by planting in narrower rows. To obtain the full benefit from this increased yield, the farmer must have harvesting equipment that can handle the increased capacity without a corresponding decrease in acreage. Since the trend is to perform processing steps such as husking, shelling and grinding in the field, it is important that light compact equipment be developed that has the ability to handle a larger capacity than the present equipment.

After snapping the ears from the stalks, the first processing step is to remove the husk. The present husking devices consist of sets of oppositely rotating husking rolls arranged in a bed. The ears are deposited on one end of the bed and as they move towards the other end, the husks are grasped by the husking rolls and torn from the ears. In husking devices such as this, there is nothing except gravity holding the ears in contact with the husking rolls and there is no assurance that the ears will be positioned in the grooves formed between two oppositely rotating rolls. As a result many husks are not removed from the ears. Also as the volume of corn being processed is increased, there is a tendency for the ears to stack up on each other and the number of ears that never contact the husking rolls is increased. Another undesirable feature of the present husking devices is that the husks are torn from the ears, there is some accompanying shelling of the corn which if provisions are not taken to reclaim is discarded with the husk.

The general purpose of this invention is to provide a husking device which embraces all the advantages of similarly employed husking devices and possesses none of the aforedescribed disadvantages. To attain this, the present invention contemplates a unique rotary type husking device having means for assuring that the ears are properly positioned with respect to the husking rolls, means for retaining the ears in contact with the husking rolls for a sufficient time to completely remove all husk and an arrangement whereby shelled corn is not discarded with the husk. In addition to performing a superior husking operation at an increased capacity, the subject rotary husking unit is light and compact and thus is adaptable for field going operation.

An object of the present invention is the provision of a light compact husking unit having a large capacity.

Another object is to provide a husking unit including means for positioning the ear corn relative to the husking rolls to insure that each ear is contacted by the husking rolls.

A further object of the invention is the provision of a husking unit including means for biasing the ears into contact with the husking rolls during the husking operation.

Still another object is to provide a husking that does not discard the shelled corn with the husk.

These and other objects of the invention will become more apparent from the specification and drawings wherein:

FIGURE 1 is a perspective rear view of the rotary husking unit.
FIGURE 2 is a side cross-sectional view of the rotary husking unit.
FIGURE 3 is an end view of the left-hand rotor disk.
FIGURE 4 is an end view of the right-hand rotor disk.
FIGURE 5 is a perspective view of the drive mechanism for the rotary husking unit.
FIGURE 6 is an isolated view of the ear straightening feed rolls having portions of the rolls broken away; and
FIGURE 7 is a cross-section view of the rotary husking unit showing the drive sprockets and gears in cross section and the husk removal auger in full lines.

Referring now to the drawings wherein like reference characters designate like or corresponding parts throughout the several views, there is shown in FIGURE 1 applicant's rotary husking unit having a frame 10 including end walls 11. As shown in FIGURE 1 the rotary husking unit is supported on wheels 12 (only one shown), however, it should be understood that the unit can be carried on a tractor mounted corn harvester in the same manner as are persently available husking units. A conveyor 13 mounted on a shaft 14 functions to deliver the corn to the husking unit. A sprocket 15 is carried on the free end of the shaft 14 for a purpose that shall be discussed. The ear corn is received in a feed hopper 20 defined by a trough 21. The trough 21 can be best seen in FIGURE 2. It should be noted that one side of the troughs 21 and 141 have been eliminated in FIGURE 1 for the purpose of showing other elements of the harvesting unit, also in FIGURE 1 the husking roll ear pressure pads 130 have not been illustrated. An auger core 23 is journalled in the end walls 11 of the frame and carries an auger flighting 22 that is located within the trough 21. The auger 22 functions to distribute the ear corn longitudinally of the trough. One free end of the core 23 carries a sprocket 24 that is aligned with sprocket 15. Sprockets 15 and 24 are connected by a chain 25, and the auger core 23 is thus driven by the conveyor 13.

The trough 21 has an opening in its bottom extending from one end wall 11 to the other. The ear straightening feed rolls 30 are located immediately below the opening in the trough 21 and like the opening extend from one end wall 11 to the other. For a description of the end straightening feed rolls 30, reference should be made to FIGURES 1, 2, 5 and 6. A drive roll 31 carried by a shaft 33 is journalled in bearings 34 that are secured by nuts and bolts 35 to the end walls 11. The drive roll 31 is made of laminated disc of tire carcass and has an ear engaging portion 32 formed by a wire spiraled around its surface. One free end of shaft 33 carries a first sheave 36 and a second sheave 37 both of which are located externally of the end walls 11. Sheaves 36 and 37 are not visible in FIGURE 1. A pair of pivot arms 38 are pivotally mounted on the end walls 11 adjacent the bearings 34. The pivot arm 38 are carried on the inside of the end walls 11, such that they are both located between said end walls. Bearings 39 are carried by the free ends of pivot arms 38, and carry a shaft 40 upon which a driven roll 41 is secured. A free end of shaft 40 carries a first sheave 42 aligned with the first sheave 36 and interconected by a chain 43. The driven roll 41 is made of laminated disc of tire carcass and has an irregular shape. Thus as shaft 33 is rotated rotary movement in the same direction will be transmitted through chain 43 to shaft 40 and the driven roll 41. The interaction between the spiraled ear engaging portion 32 of drive roll 31 and the floating driven roll 41 functions to align the ears with the straightening rolls. As can be seen in FIGURE 5, rotary motion is supplied to shaft 33 through the second sheave 37 as shall be discussed in more detail.

A drum shaped rotor 50 is mounted for rotation on end walls 11. The rotor 50 is made of a right rotor disk 51, a left rotor disk 52 connected by a plurality of ear carrier plates 55. The rotor illustrated in the accompanying figures has five ear carrier plates 55, however, it should be understood that this is by way of example and the number of ear carrier plates is determined by the desired capacity and the diameter of the rotor 50. Each of the ear carrier plates 55 has a rolled leading axial edge 56 and a trailing axial edge 57. Tabs 58 are provided on the ends of each ear carrier plate 55 to faciliate securing the plates to the rotor disk 51 and 52. As can be best seen in FIGURE 2 a strip 60 of sheet material is secured to the underside of each ear carrier plate adjacent the rolled leading axial edge 56. The strip 60 along with the rolled axial edge 56 forms a pocket into which an outer husking roll 81 is mounted. Each of the ear carrier plates 55 has secured to its undersurface strips 61 of sheet material adjacent the trailing axial edge 57 forming a pocket into which the inner husking roll 83 is located. The edge 56 and 57 of the ear carrier plates and of the strips 60 and 61 cooperate with the husking rolls to remove any material that has adhered to the surface of the rolls.

Pairs of husking rolls are rotatably supported by the rotor disk 51 and 52 between each leading edge 56 and trailing edge 57. In each of a pair of husking rolls there is an outer roll 81 and an inner roll 83. The outer rolls 81 are located with respect to the rotor disk 51 and 52 along an outer circle 54 (FIGURE 3). The inner rolls 83 are located with respect to the rotor disk 51 and 52 along an inner circle 53 (FIGURE 3). The inner husking roll 83 is carried on a core 84 and is mounted for rotation on a fixed bearing 85 that is carried by the right rotor disk 51, and a fixed bearing 86 that is carried by the left rotor disk 52. A spur gear 101 is connected to a free end portion of core 84 adjacent the outer surface of the left rotor disk 52. The free end portion of core 84 also carries a key and lock nut 102 for securing the spur gear in place.

The outer husking roll 81 includes a core 82 and is mounted such that it is biased into engagement with the inner husking roll 83.

Referring now to FIGURE 3, the means for mounting one end of the outer roll 81 on the left rotor disk 52 will be described. A core 82 of the husking roll extends through an aperture 89 that is considerably larger than the core 82. A pivot arm 91 is pivotally supported on the rotor disk by a pivot pin 93 that extends through an aperture 92 formed in the pivot arm 91. The pivot arm 91 carries a bearing 94 that supports the core 82 of the outer husking roll 81. The pivot arm 91 has a free end portion 95 in which there is formed an aperture 96. A tab 87 having an aperture 88 formed therein extends outwardly from the rotor disk 52. A bolt 98 extends through the aperture 88 formed in tab 87 and through the aperture 96 formed in the free end 95 of the pivot arm 91. The shank of bolt 98 carries a spring 100 and washer 99 between the tab 87 and the head of the bolt 98. A nut 97 is carried by the bolt 98 on the other side of the free end portion 95. As seen in FIGURE 3, the spring 100 exerts a force to pivot the pivot arm 91 in a counterclockwise direction about pivot pin 93. A spur gear 103 is secured to the core 82 by a key or the like such that it will rotate with the core and the spur gear is held in position on the core by a lock nut 90. It should be noted that for the purpose of illustration in FIGURE 3, the lock nut 90 and spur gear 103 has not been shown on the upper left-hand core 82. This was done to more clearly show the construction of the pivot arm 91. Spur gears 101 and 103 are adapted to mesh with each other such that the outer husking roll 81 receives its rotary motion from the inner husking roll 83. Spur gears 101 receive their drive from a main spur gear 105 as shall be discussed in more detail.

Referring now to FIGURE 4, the means for mounting the right end of outer husking rolls 81 on the right rotor disk 51 shall be described. The core 82 of the husking roll extends through an aperture 109 formed in the rotor disk that is of considerably larger diameter than is the core 82. Pivot pins 113 carried by the rotor disk extend through apertures 112 formed in the pivot arms 111 to mount the arms for pivotal movement. A bearing 114 for supporting the core 82 is carried by one free end of pivot arm 111. An aperture 115 is formed in the other free end of pivot arm 111. Tabs 108 extend outwardly from the surface of the rotor disk 51 and have apertures 110 formed therein. Bolts 116 carrying washers 118 and springs 119 extend through the apertures 110 and 115 and are secured in place by nuts 117. As seen in FIGURE 4, the springs 119 have a tendency to pivot the outer husking roll 81 clockwise about pivot pin 113.

A hollow pivot shaft 65 is secured centrally to the left rotor disk 52 by welding or the like. As can be best seen in FIGURE 7, the hollow pivot shaft 65 is journalled in bearing 66 carried by the end wall 11. On the free end portion of the hollow pivot shaft 65 extending through the end wall 11 there is secured a sprocket 67 by which rotation is supplied to the rotor 50. A husk discharge tube 62 is secured centrally to the right rotor disk 51 along the periphery of a circular opening 68 formed in the right rotor disk 51. The husk discharge tube 62 extends through a circular opening 69 formed in the end wall 11. There are a plurality of rollers 59 secured to the end wall 11 about the circular opening 69 where they are adapted to engage an annular groove 63 formed in the adjacent portion of the husk discharge tube 62. These rollers 59 constitute the bearing means for journalling the right end of the rotor 50 on the end wall 11. A sprocket 64 is secured to the husk discharge tube 62 on the outer side of the end wall 11 and as shall be described in more detail is part of the drive means for the auger 142. The hollow pivot shaft 65 constitutes the journal means for the main spur gear 105. As can be best seen in FIGURE 7 the main spur gear 105 is integrally connected to a sprocket 106 by a collar 107. As shall be described in more detail rotary motion is supplied to the sprocket 106 and thus to the husking rolls through the main spur gears 105, 101 and 103. The hollow pivot shaft 65 also constitutes the journal means for the core 71 of the husk removal means 70. The husk removal means comprises an auger flighting secured to the core 71 that extends internally through the rotor 50 and out through the husk discharge tube 62. The core 71 has a shoulder 72 to prevent axial movement toward the left as seen in FIGURE 7 and a flat spacer 73 is provided to prevent axial movement in the opposite direction. A sprocket 75 is secured to the free end portion of the core 71 externally of the end wall 11 through which rotary motion is supplied to the husk removal means 70.

Referring now to FIGURE 2 the husking roll ear pressure pads 130 will be described. A plurality of ear pressure pads 130 are supported by the end walls 11 and are arranged in an arc concentric to the axis of the rotor 50. As will be described in more detail the ear pressure pads are adapted to resiliently engage the ears of corn resting on the ear carrier plates 55 and the corn husking rolls 81 and 83. Each of the ear pressure pads 130 includes a bar 131 having an end plate 132 at each end. The end plates 132 are secured to the end walls 11. A strip of elastomer material 133 is secured to the bar 131 and extends from one end wall 11 to the other. A plurality of back-up springs made from flat spring steel are secured to the bars 131 and function to bias the elastomer pad into engagement with the rotor 50.

Referring now to FIGURES 1, 2 and 5, the husk corn conveyor 140 will be described. A generally V-shaped trough 141 is located at the bottom of the unit and extends from one end wall 11 to the other. It should be noted in FIGURE 1 a portion of this trough 141 has been broken away to more clearly show the auger 142. A core 143 journalled on the end walls 11 carries the auger flighting 142 in the area beneath the rotor 50. The core 143 extends through the right end wall 11 and has secured thereto a sprocket 144. Sprocket 144 is aligned with sprocket 64 carried by the husk discharge tube and the two sprockets are connected by a chain 146. Thus the auger 142 receives its drive from the husk discharge tube which is integral with the rotor 50. The auger 142 is adapted to convey the husked ears axially along the trough 141 and discharge them through an opening 147 formed in the left end wall 11 into an elevator 145.

The three sprockets 75, 67 and 106 as can be best seen in FIGURE 7 are each driven by a separate chain. As shown in FIGURE 5 a drive shaft 151 carries a first sprocket 152 aligned with sprocket 67, a second sprocket 154 aligned with sprocket 75 and a third sprocket 156 aligned with sprocket 106. Rotary motion is transmitted from this first sprocket 152 to sprocket 67 by a first chain 153. Rotary motion is transmitted from second sprocket 154 to sprocket 75 through a second chain 155 and rotary motion is transmitted from the third sprocket 156 to sprocket 106 by a third chain 157. The chain 155 that transmits rotary motion from the second sprocket 154 to sprocket 75 also engages sprocket 37 for driving the ear straightening rolls. As shown schematically in FIGURE 5 rotary motion is transmitted from the rotor 50 through sprocket 64 to the auger 142 by a chain 146.

*Operation*

Ears of corn having the husk intact are deposited in the feed hopper 20. The auger 22 distributes the ears of corn longitudinally of the trough 21. As the ears of corn fall through the bottom of the trough 21 they encounter the ear straightening rolls 30. When an ear falls upon the ear straightening rolls transverse to their axes the rolls tend to rotate the ear until it lies parallel to the axes of the rolls. When the ear is parallel to the axes of the rolls there is sufficient clearance for the ear to pass between the rolls where it will engage the rotor 50. The generally cylindrical surface of rotor 50 is made up of the ear carrier plates 55 and the husking rolls 81 and 83. The outer surface of the ear carrier plates 55 do not lie along a true cylinder with respect to the axis of the rotor 50 but rather converge inwardly from the leading axial edge 56 towards the trailing axial edge 57. Thus as an ear of corn engages an ear carrier plate 55 there is a tendency for it to slide toward the trailing edge 57 and into engagement with the husking rolls. At this point the trailing edge 57 of one ear carrier plate is closer to the axis of rotor 50 than is the leading edge 56 of the adjacent ear carrier plate. Thus the ear will be trapped between the trailing edge 57 of one ear carrier plate and the leading edge 56 of the following ear carrier plate. The husking rolls 81 and 83 are carried on the rotor 50 such that their surfaces form a pocket between adjacent ear carrier plates. From the foregoing it will be understood that an ear of corn passing through the straightening rolls will be directed into engagement with the corn husking rolls 81 and 83. As the rotor 50 continues to rotate the ear will be biased into engagement with the husking rolls by the ear pressure pads 130. In the embodiment illustrated the ear pressure pads 130 extend over an arc of approximately 220°. As can be best understood by considering FIGURE 2, it will be seen that as an ear in engagement with the corn husking rolls is carried past the last ear pressure pad it will be free to fall by gravity into the trough 141 where it will be moved axially by auger 142 and deposited into the elevator 145.

As the ears of corn are held into engagement with the husking rolls, the husking rolls will grip the husk and tear from the ear. The husk will then be released by the husking rolls internally of the rotor 50. In the event the husk cling to the husking rolls they will be stripped from the rolls by the edges of plates 60 and 61. After the husks have been released by the husking rolls they will fall and engage the husk removal auger 74. The husk removal auger 74 will convey the husks axially towards the right-hand end wall 11 and out through the husk discharge tube 62. As quite often occurs some kernels of corn will be pulled from the ears along with the husk and will fall free internally of the rotor 50. Because of the high density of these kernels as compared with the husk there will be less tendency for the auger 74 to convey them through the husk discharge tube and they will eventually fall to the bottom of the rotor where they can escape through the pressure pads 130 into the trough 141. Thus any kernels of corn that the unintentionally removed from the ears with the husk will eventually find their way into the trough 141 with the ears of corn.

It should be understood, of course, that the foregoing disclosure relates to only a preferred embodiment of the invention and that numerous modifications or alterations may be made therein without departing from the spirit and scope of the invention as set forth in the appended claims.

What is claimed is:
1. A husking unit comprising:
a frame;
a cylindrical rotor mounted for rotation on said frame along a generally horizontal axis, the cylindrical surface of said rotor including a plurality of ear carrier plates spaced from each other to provide axially aligned slots in said cylindrical surface;
sets of husking rolls carried by said cylindrical rotor beneath said cylindrical surface adjacent said axially aligned slots;
feed means located above the cylindrical rotor for receiving and depositing ear corn in axial alignment on the surface of said cylindrical rotor;
a plurality of pressure pads biased into engagement with the exterior of said cylindrical surface, said pads carried by said frame and arranged along an arc concentric to the rotor axis and extending from said feed means to the bottom of said cylindrical rotor.

2. The invention as set forth in claim 1 wherein said feed means includes a pair of spaced straightening rolls arranged parallel to said husking rolls, means for rotating said straightening rolls in the same direction as said cylindrical rotor, and one of said straightening rolls having a spiralled surface that functions to spread the ear corn axially along said straightening rolls.

3. The invention as set forth in claim 1 wherein said plurality of pressure pads extend over an arc of approximately 220°.

4. The invention as set forth in claim 3 wherein said plurality of pressure pads is at all times acting upon at least three sets of husking rolls.

5. The invention as set forth in claim 1 wherein each of said ear carrier plates has a leading and trailing axial edge, each of said leading axial edges being closer to the peripheral edges of said cylindrical rotor than the corresponding trailing axial edges such that the leading and trailing axial edges of adjacent ear carrier plates form pockets into which the ear corn is directed.

6. The invention as set forth in claim 5 wherein said ear carrier plates have strips secured thereto adjacent the leading and trailing edges extending axially from the interior surface to form pockets into which the husking rolls are set.

7. A husking unit comprising:
a frame including a pair of upright laterally spaced end walls;
a rotor husking drum and means for journalling it on said end walls about a substantially horizontal axis, said rotor husking drum including a first rotor disk, a second laterally spaced rotor disk, a cylindrical surface made up of a plurality of axially extending ear carrier plates spaced to provide slots between adjacent plates and set the husking rolls located in said slots;
feed means supported by said end walls and located above said rotor husking drum for receiving and depositing ear corn in axial alignment on said cylindrical surface;

a plurality of elongated pressure pads supported by said end walls and biased into engagement with said cylindrical surface, said pads supported by said end walls and arranged along an arc concentric to the rotor axis and extending from said feed means to the bottom of said rotor husking drum.

8. The invention as set forth in claim 7 wherein said means for journalling the rotor husking drum on said end walls include a hollow pivot shaft extending outwardly from said first rotor disk, and a husk discharge tube extending outwardly from said second rotor disk, bearing means carried by said end walls for journalling said hollow pivot shaft and said discharge tube.

9. The invention as set forth in claim 8 wherein there is provided a rotary husk removal means within said rotor husking drum for discharging husk through said husk discharge tube and wherein said rotary husk removal means is journalled in said hollow pivot shaft.

10. The invention as set forth in claim 9 wherein said sets of husking rolls are journalled on said first and second rotor disks and have spur gears connected thereto located between said first rotor disk and the adjacent end wall, and wherein a main spur gear in driving engagement with said spur gears is journalled on said hollow pivot shaft.

11. The invention as set forth in claim 7 wherein said plurality of elongated pressure pads extend over an arc approximately 220°.

12. The invention as set forth in claim 7 wherein said plurality of pressure pads is at all times acting upon at least three sets of husking rolls.

13. The invention as set forth in claim 7 wherein each of said axially extending ear carrier plates has a leading and a trailing edge, each of said leading edges being closer to the peripheral edges of said cylindrical rotor than the corresponding trailing edges such that the leading and trailing edges of adjacent ear carrier plates form pockets into which the ear corn is directed.

14. The invention as set forth in claim 13 wherein said ear carrier plates have strips secured thereto adjacent the leading and trailing edges extending axially from the interior surface to form pockets into which the husking rolls are set.

References Cited

UNITED STATES PATENTS

| | | | |
|---|---|---|---|
| 1,201,476 | 10/1916 | Leister et al. | 130—5 |
| 2,818,072 | 12/1957 | Jones | 130—5 |
| 3,245,413 | 4/1966 | Essex | 130—5 |

ANTONIO F. GUIDA, *Primary Examiner.*